United States Patent
Park et al.

(10) Patent No.: US 9,859,544 B2
(45) Date of Patent: Jan. 2, 2018

(54) BATTERY MODULE

(71) Applicant: SAMSUNG SDI CO., LTD., Yongin-si, Gyeonggi-do (KR)

(72) Inventors: Shi-Dong Park, Yongin-si (KR); Jong-Han Rhee, Yongin-si (KR); Tae-Yong Kim, Yongin-si (KR); Jun-Woo Cho, Yongin-si (KR); Seong-Joon Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 365 days.

(21) Appl. No.: 14/477,036

(22) Filed: Sep. 4, 2014

(65) Prior Publication Data

US 2015/0079447 A1    Mar. 19, 2015

(30) Foreign Application Priority Data

Sep. 17, 2013  (KR) .................. 10-2013-0111609

(51) Int. Cl.
  *H01M 2/10*    (2006.01)
  *H01M 2/20*    (2006.01)
  *H01M 2/02*    (2006.01)

(52) U.S. Cl.
  CPC ......... *H01M 2/204* (2013.01); *H01M 2/1077* (2013.01); *H01M 2/206* (2013.01)

(58) Field of Classification Search
  CPC ........ H01M 2/10; H01M 2/20; H01M 2/1077; H01M 2/204; H01M 2/206; H01M 2/26; H01M 2/30; H01M 2/32; H01M 2/34
  See application file for complete search history.

(56) References Cited

U.S. PATENT DOCUMENTS

| | | | |
|---|---|---|---|
| 2,324,185 A | * | 7/1943 | Ambruster ............ H01M 2/02 429/129 |
| 5,576,516 A | | 11/1996 | Kameyama et al. |
| 2004/0043663 A1 | | 3/2004 | Ikeda et al. |
| 2009/0053588 A1 | * | 2/2009 | Marukawa .......... H01M 2/1072 429/97 |
| 2010/0116570 A1 | | 5/2010 | Sugawara et al. |
| 2012/0058381 A1 | | 3/2012 | Carignan et al. |
| 2013/0089996 A1 | | 4/2013 | Zhao |

FOREIGN PATENT DOCUMENTS

| | | |
|---|---|---|
| EP | 2612386 | 3/2012 |
| JP | 2010-097722 A | 4/2010 |
| JP | 2011-171192 A | 9/2011 |
| WO | WO 2013/052519 A2 | 4/2013 |

OTHER PUBLICATIONS

Machine Translation of: JP 2010/097722, Tada et al., Apr. 30, 2010.*
European Search Report dated May 2, 2016.
European Search Report dated Jan. 19, 2015.

* cited by examiner

*Primary Examiner* — Kenneth J Douyette
(74) *Attorney, Agent, or Firm* — Lee & Morse, P.C.

(57) ABSTRACT

A battery module includes a plurality of battery cells aligned in one direction, each battery cell of the plurality of battery cells including a terminal portion on a first surface of a respective battery cell, a bus-bar electrically connect between the terminal portions of the plurality of battery cells, and a bus-bar holder positioned on the first surfaces of the plurality of battery cells, the bus-bar holder including support portions configured to support two different surfaces of the bus-bar, respectively.

20 Claims, 5 Drawing Sheets

BATTERY MODULE

CROSS-REFERENCE TO RELATED APPLICATION

Korean Patent Application No. 10-2013-0111609, filed on Sep. 17, 2013, in the Korean Intellectual Property Office, and entitled: "Battery Module," is incorporated by reference herein in its entirety.

BACKGROUND

1. Field

Embodiments relate to a battery module.

2. Description of the Related Art

A high-power battery module using a non-aqueous electrolyte with high energy density has recently been developed. The high-power battery module is configured as a high-voltage or large-capacity battery module manufactured by connecting a plurality of battery cells in parallel or series so as to be used in driving motors of devices requiring high power, e.g., electric vehicles and the like. Further, a battery pack can be configured by electrically connecting such a plurality of battery modules to one another.

As the number of devices employing the battery module increases, studies have been conducted to improve the productivity of the battery module. As the external appearance of the devices is diversified, it is required to vary the shape of the battery module. However, the safety of the battery module should be basically secured. Therefore, studies on the structure of a battery module capable of satisfying all the requirements have been conducted in various fields.

SUMMARY

According to embodiments, there is provided a battery module including a plurality of battery cells aligned in one direction, each battery cell of the plurality of battery cells including a terminal portion on a first surface of a respective battery cell, a bus-bar electrically connect between the terminal portions of the plurality of battery cells, the bus-bar including first and second surfaces, and a bus-bar holder positioned on the first surfaces of the plurality of battery cells, the bus-bar holder including support portions configured to support two different surfaces of the bus-bar, respectively.

The bus-bar may have a first surface opposite to the one surface of the battery cell, and a second surface opposite to the first surface.

The support portion may include a first support portion configured to support the first surface; and a second support portion configured to support the second surface.

The second support portion may be provided with a pair of second support portions to respectively support both sides of the bus-bar. The first support portion may be positioned between the pair of second support portions.

The bus-bar may include a first connecting portion connected to the terminal portion of any one battery cell among the plurality of battery cells, a second connecting portion connected to the terminal portion of another battery cell adjacent to the one battery cell, and a bending portion configured to connect the first and second connecting portions, the bending portion being bent to protrude in the direction distant from the battery cell.

The first support portion may be positioned between the bending portion and the battery cell. The second support portion may be positioned on the second surface of the first and second connecting portions.

The first support portion and the bending portion may be spaced apart from each other.

The first support portion may have elasticity.

The first support portion may be protruded in the direction distant from the battery cell to correspond to the shape of the bending portion.

The bus-bar may further include an extending portion extended from at least one of the first and second connecting portions, to be extended to a top surface of the bus-bar holder.

The extending portion may have a bus-bar fastening portion provided at an end portion thereof, and the bus-bar fastening portion may be extended on a holder fastening portion formed in the bus-bar holder.

The first support portion may limit the bus-bar to be moved adjacent to the battery cell, and the second support portion may limit the bus-bar to be moved distant from the battery cell.

The bus-bar may be welded to the terminal portion.

An opening through which at least one portion of the bus-bar is exposed may be formed in the bus-bar holder.

At least one portion of the bus-bar may be bent to protrude in the direction distant from the battery cell.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to those set forth herein. Rather, these embodiments are provided so that this disclosure will be thorough and complete, and will fully convey the scope of the example embodiments to those skilled in the art. Accordingly, the drawings and description are to be regarded as illustrative in nature and not restrictive.

In the drawing figures, dimensions may be exaggerated for clarity of illustration. In will be understood that when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Further, it will be understood that when an element is referred to as being "between" two elements, it can be the only element between the two elements, or one or more intervening elements may also be present. Hereinafter, like reference numerals refer to like elements throughout.

Terms or words used in this specification and claims should not be restrictively interpreted only as ordinary meanings or dictionary-based meanings, but should be interpreted as meanings and concepts conforming to the scope of the embodiments on the basis of the principle that a person of skill in the art can properly define the concept of a term to describe and explain embodiments in the best ways.

Figure 1:
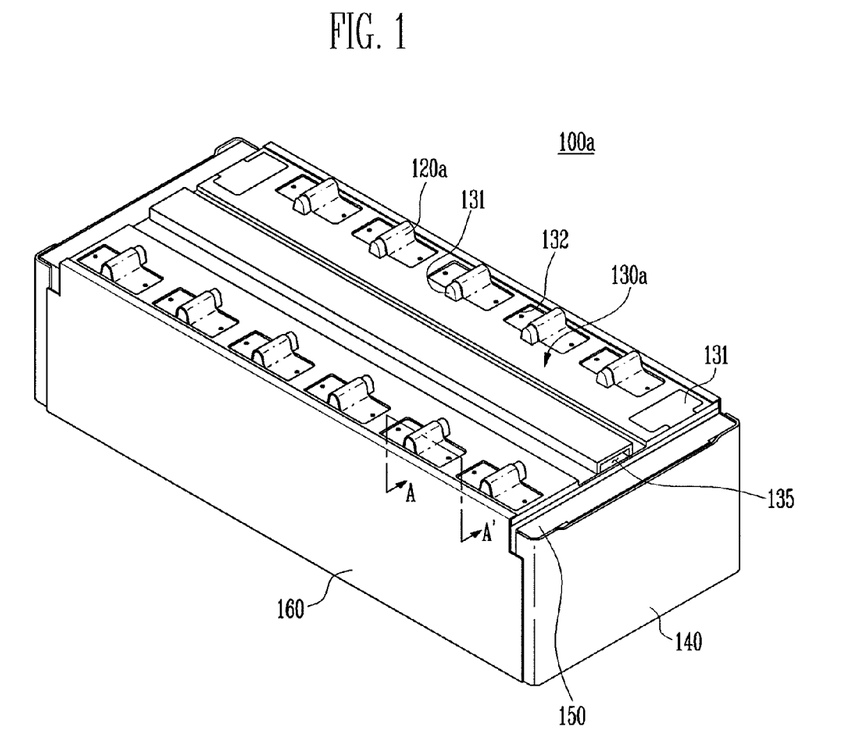
FIG. 1 illustrates a perspective view of a battery module according to an embodiment.
Figure 2:
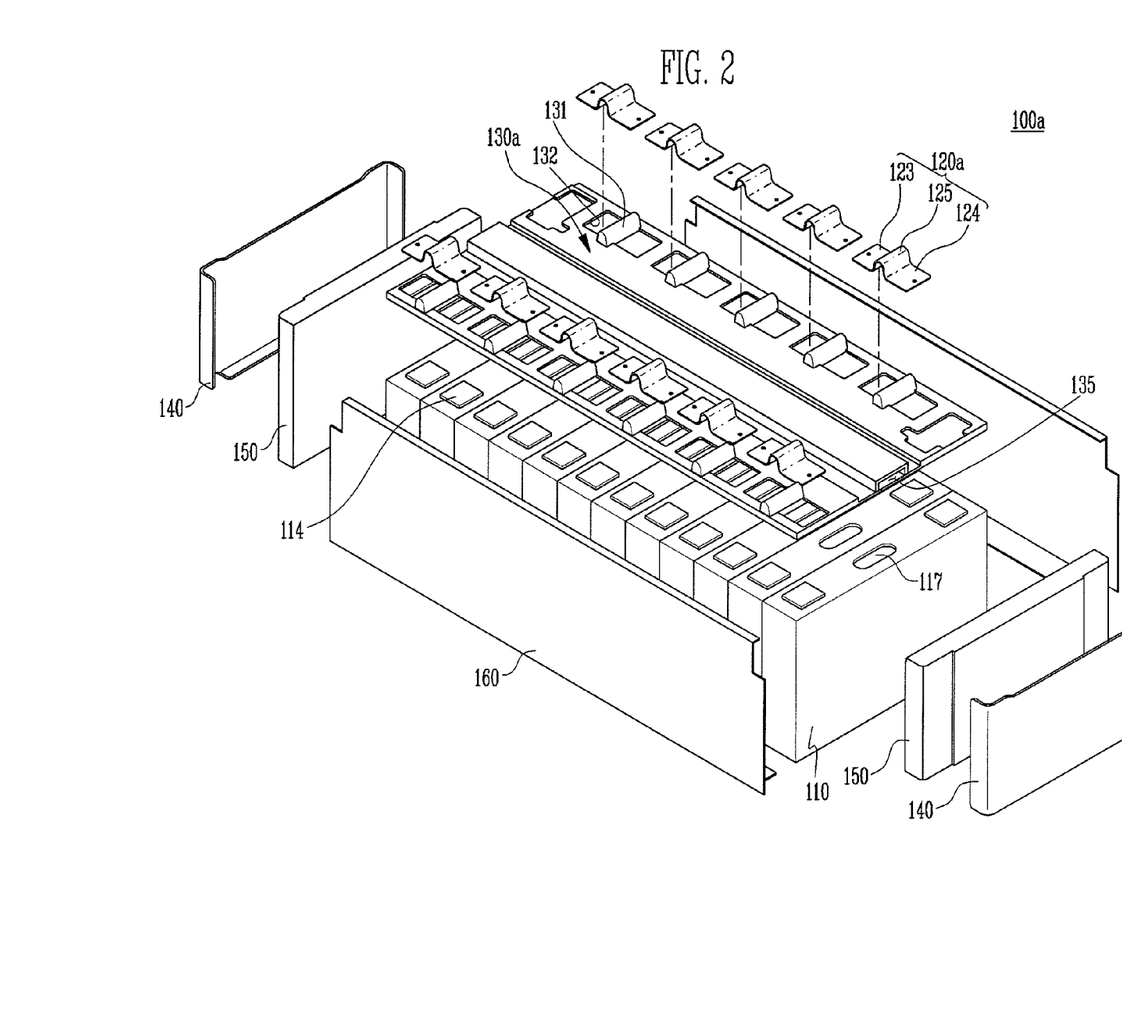
FIG. 2 illustrates an exploded perspective view of the battery module in FIG. 1.

FIG. 1 illustrates a perspective view of a battery module 100a according to an embodiment. FIG. 2 illustrates an exploded perspective view of the battery module 100a. Hereinafter, the battery module 100a according to this embodiment will be described with reference to FIGS. 1 and 2.

As shown in FIGS. 1 and 2, the battery module 100a according to this embodiment may include a plurality of battery cells 110 aligned in one direction, bus-bars 120a configured to connect between terminal portions 114 of adjacent battery cells 110, and a bus-bar holder 130a positioned on one surface of the plurality of battery cells 110. The bus-bar holder 130a may include support portions 131 and 132 configured to respectively support both surfaces of the bus-bar 120a.

The battery cell 110 is a member which generates energy. The plurality of battery cells 110 may be aligned in one direction. Here, each battery cell 110 may include a battery case of which one surface is opened, and an electrode assembly and an electrolyte, which are accommodated in the battery case. In this case, the electrode assembly and the electrolyte may generate energy through an electrochemical reaction therebetween. The battery case may be hermetically sealed by one surface of the battery cell 110 including, e.g., a cap assembly. In addition, a terminal portion 114, i.e., positive and negative electrode terminals having different polarities, may be formed to protrude from a first surface of the battery cell 110, e.g., the terminal portion 114a may protrude through the cap assembly. A vent portion 117 acting as a passage through which gas generated in the battery cell 110 is exhausted to the outside of the battery cell 110 may be further formed as a safety means of the battery cell 110 in the first surface of the battery cell 110.

The bus-bar 120a is a member which connects between the terminal portions 114 of adjacent battery cells 110 among the plurality of battery cells 110, thereby implementing the serial or parallel electrical connection between the battery cells 110. Here, the bus-bar 120a may be fixed to the terminal portion 114 through, e.g., a process such as welding. The bus-bar 120a may be supported by the bus-bar holder 130a.

The bus-bar holder 130a is a member positioned on, e.g., directly on, the first surface of the battery cell 110, i.e., the bus-bar holder 130a is on a same surface through which the terminal portion 114 protrudes. The bus-bar holder 130a may support the bus-bar 120a. Here, the bus-bar holder 130a may be made of an insulating material not to be short-circuited with the battery cell 110. The bus-bar holder 130a may be formed to have a size in which the bus-bar holder 130a can cover, e.g., overlap, the entire first surface of the plurality of battery cells 110. For example, the bus-bar holder 130a may be a continuous layer overlapping an entire top of the battery module 100a, e.g., the bus-bar holder 130a may continuously and simultaneously overlap the first surfaces of all the battery cells 110 within the battery module 100a. A gas path 135, through which gas from the vent portions 117 of the plurality of battery cells 110 is extracted, may be provided to the bus-bar holder 130a, e.g., the gas path 135 may extend through the bus-bar holder 130a to overlap all the vent portions 117 of the plurality of battery cells 110 in the battery module 100a.

Meanwhile, the battery module 100a according to this embodiment may further include an end plate 140, a side plate 160, and an end block 150.

The end plate 140 is a member disposed at the outside of an outermost battery cell 110 among the plurality of battery cells 110. The end plate 140 may settle, together with the end block 150, the plurality of battery cells 110 in the arrangement direction of the plurality of battery cells 110. Here, the end plate 140 may be made of e.g., a metal to sufficiently ensure the rigidity of the battery module 100a. The end plate 140 may be configured with a pair of end plates respectively positioned at outsides of wide surfaces of both the outermost battery cells 110. The pair of end plates 140 form, together with the side plate 160 connecting between the pair of end plates 140, a housing, thereby protecting the battery cells 110. Since the end block 150 is positioned between the end plate 140 and the outermost battery cell 110, the end plate 140 may have a bent shape to protect the end block 150. The end plate 140 may be coupled to the side plate 160 through a bent portion, e.g., via welding.

The end block 150 is a member positioned between the end plate 140 and the outermost battery cell 110. The end block 150 may settle, together with the end plate 140, the plurality of battery cells 110 in the arrangement direction of the plurality of battery cells 110. Here, the end block 150 may be made of a material having a property different from that of the end plate 140. Since the end block 150 may contact the outermost battery cell 110, the end block 150 may be made of an insulating material to prevent or substantially minimize risks, e.g., a short circuit. The end block 150 may be configured with a pair of end blocks respectively corresponding to the pair of end plates 140.

Figure 3:
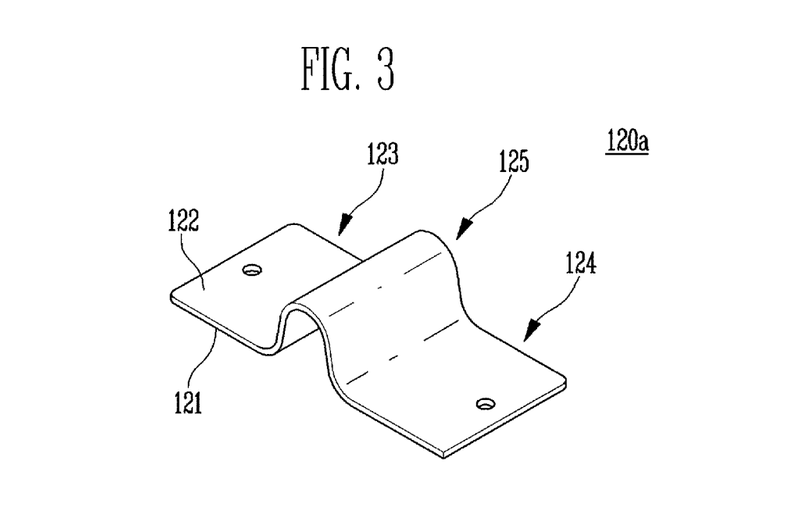
FIG. 3 illustrates a perspective view of a bus-bar in the battery module in FIG. 1.
Figure 4:
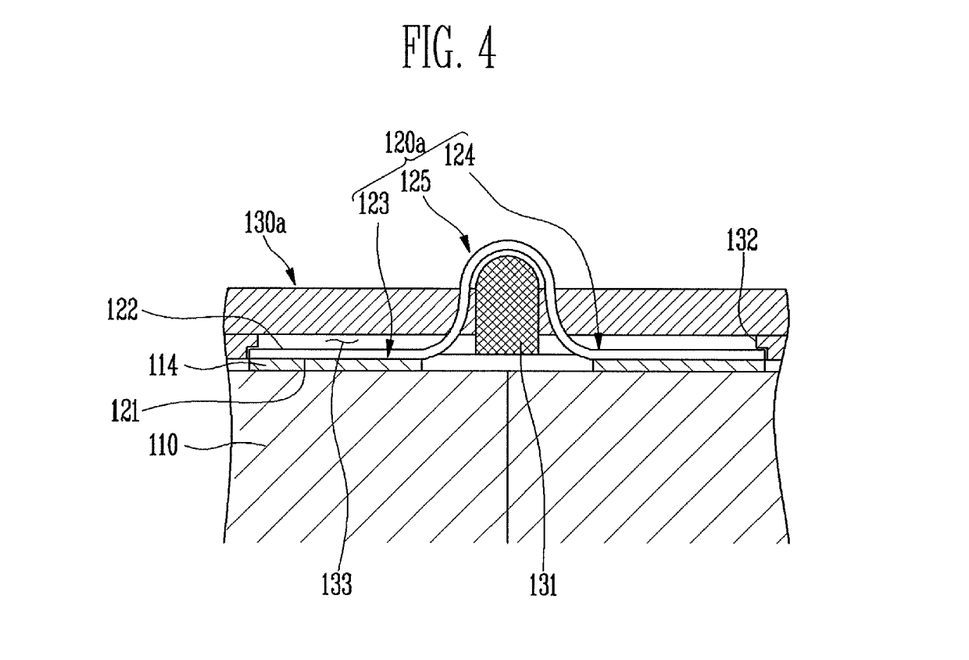
FIG. 4 illustrates a sectional view taken along line A-A' of the battery module shown in FIG. 1.
Figure 5:
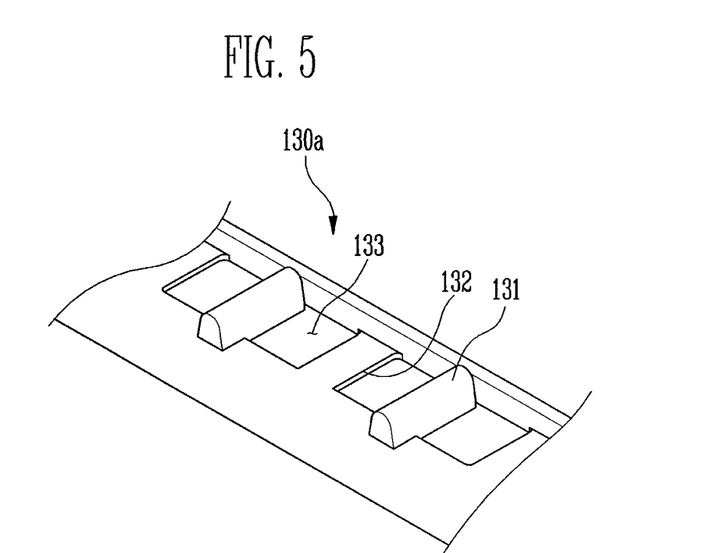
FIG. 5 illustrates a partial perspective view of a bus-bar holder of the battery module shown in FIG. 1.

FIG. 3 illustrates a perspective view of the bus-bar 120a of the battery module 100a shown in FIG. 1. FIG. 4 illustrates a sectional view taken along line A-A' of the battery module 100a shown in FIG. 1. FIG. 5 illustrates a partial perspective view of the bus-bar holder 130a of the battery module 100a shown in FIG. 1. Hereinafter, the bus-bar 120a and the bus-bar holder 130a according to this embodiment will be described in detail with reference to FIGS. 3 to 5.

As shown in FIGS. 3 and 4, the bus-bar 120a according to this embodiment may have a bent, e.g., curved, shape so that at least one portion of the bus-bar 120a is protruded. For example, as shown in FIGS. 3 and 4, at least one portion of the bus-bar 120a protrudes above the first surface of the battery cell 110 to define a space between a bottom surface of the protruding portion and the first surface of the battery cell 110.

In detail, the bus-bar 120a may include a first connecting portion 123, a second connecting portion 124, and a bending portion 125 configured to connect the first and second connecting portions 123 and 124. In this case, the first and second connecting portions 123 and 124 may have, e.g., a flat plate shape, and the bending portion 125 may be bent to protrude away, e.g., in a direction distant, from the battery cell 110.

The bus-bar 120a may have a first surface 121 facing the first surface of the battery cell 110, i.e., the surface through which the terminal portion 114 protrudes, and a second surface 122 opposite the first surface 121. The first surfaces 121 of the first and second connecting portions 123 and 124 are respectively disposed opposite to terminal portions 114 of different battery cells 110, e.g., to face and overlap corresponding terminal portions 114, and to be connected to corresponding terminal portions 114 through welding. The first surfaces 121 of the first and second connecting portions 123 and 124 are electrically connected to each other through the bending portion 125, to connect the different, e.g., adjacent, battery cells 110 in parallel or series. Since the center of the bending portion 125 is protruded, the bending portion 125 may be separated, e.g., spaced apart, from the battery cell 110, e.g., to define a space between the first surface 121 of the center of the bending portion 125 and the first surface of the battery cells 110.

In a case where at least one portion of the bus-bar 120a is bent, stress generated by processes, e.g., by welding, may be substantially reduced. Accordingly, it is possible to prevent or substantially minimize damage to the bus-bar 120a. Although the bending portion 125 is illustrated in the figures as a curved surface, embodiments are not limited thereto. For example, the bending portion 125 may be bent to include linear portions, e.g., to include a straight line shape.

As shown in FIGS. 4 and 5, the bus-bar holder 130a may include support portions 131 and 132 configured to respectively support the first and second surfaces 121 and 122 of the bus-bar 120a, so as to align the position of the bus-bar 120a. Here, a first support portion 131 and a second support portion 132 may be included in the bus-bar holder 130a. For example, the bus-bar holder 130a may be positioned to have the first support portion 131 under the first surface 121 of the bending portion 125 and the second support portion 132 above the second surface 122 of the first and second connecting portions 123 and 124 for sufficient support and alignment.

In detail, the second support portion 132 may be provided with a pair of second support portions at positions respectively corresponding to both sides of the bus-bar 120a so as to support both the sides of the bus-bar 120a. That is, the pair of second support portions correspond to, e.g., overhang, corresponding edges of the first and second connecting portions 123 and 124 of the bus-bar 120a. The first support portion 131 may be positioned at an approximate center between the pair of second support portions 132. Here, that the second support portion 132 is provided with "a pair of second support portions" does not means that only two second support portions 132 exist in one bus-bar holder 130a but means that a pair of second support portions 132 are provided per one bus-bar 120a. That is, if three bus-bars 120a are included, the second support portion 132 are provided with a pair of second support portions per each bus-bar 120a, so that a total of six second support portions may be provided.

An opening 133, through which at least one portion of the bus-bar 120a is exposed, may be provided in the bus-bar holder 130a. For example, the opening 133 may expose the second surface 122 of the first and second connecting portions 123 and 124 of the bus bar 120a to facilitate welding of the first surface 121 and the terminal portion 114 of the battery cell 110 therethrough. The opening 133 may be provided between the first and second support portions 131 and 132. That is, the opening 133 will be described as a unit where one bus-bar 120a is positioned. That is, the second support portion 132, the opening 133, the first support portion 131, the opening 133 and the second support portion 132 may be sequentially positioned along a horizontal direction, i.e., along a line connecting two adjacent battery cells 110.

Meanwhile, the first and second support portions 131 and 132 respectively support both surfaces of the bus-bar 120a. For example, the first support portion 131 may support the first surface 121 of the bus-bar 120a, and the second support portion 132 may support the second surface 122 of the bus-bar 120a.

In detail, the first support portion 131 is positioned between the bus-bar 120a and the battery cell 110 to limit movement of the bus-bar 120a toward the battery cell 110. The second support portion 132 is configured with a pair of second support portions respectively positioned on the second surfaces 122 of the first and second connecting portions 123 and 124 of the bus-bar 120a, thereby limiting movement of the bus-bar 120a away from the battery cell 110. That is, movement of the bus-bar 120a away from or toward the battery cell 110 is limited by the first and second support portions 131 and 132, so that the bus-bars 120a can be aligned in the bus-bar holder 130a.

Here, the term "supporting" does not necessarily mean that the bus-bar 120a is directly contacted with the first and second support portions 131 and 132, e.g., the bus-bar 120a may be spaced apart from the first and second support portions 131 and 132. In addition, the bus-bar 120a may be disposed from the first and second support portions 131 and 132 to a degree where the movement of the bus-bar 120a is limited to an extent. In this case, the positions of the first and second support portions 131 and 132 may be previously aligned before the bus-bar 120a and the terminal portion 114 are coupled through welding or the like, so that it is possible to conveniently perform the welding process. In addition, the bus-bar 120a is coupled to the terminal portion 114 through welding or the like, so as to be fixed so that the position of the bus-bar 120a is stable and stationary, i.e., so the bus-bar 120a does not moved.

Meanwhile, the first support portion 131 is positioned opposite to the first surface 121 of the bending portion 125, and supports the bending portion 125 having a protruded shape. Hence, the first support portion 131 may be formed to protrude away, i.e., in a direction distant from, the battery cell 110 in a shape corresponding to the bending portion 125. Thus, the bending portion 125 may be more effectively supported by the first support portion 131. In addition, the first support portion 131 may be spaced apart from the bending portion 125 without being contacted by the bending portion 125. Accordingly, although an external force is applied to the bus-bar 120a, there is provided a marginal space in which the bus-bar 120a can be deformed, and thus it is possible to reduce stress applied to the bus-bar 120a. In a case where the first support portion 131 is made of a material having elasticity, the first support portion 131 can more effectively support the bending portion 125. Further, the first support portion 131 reduces impact applied to the bus-bar 120a even after the bus-bar 120a is fixed to the terminal portion 114, thereby reducing the stress against the bus-bar 120a.

The second support portion 132, as shown in FIG. 4, may be formed in a latching projection which prevents the second surfaces 122 of the first and second connecting portions 123 and 124 from being lifted upward. For example, the bus bar 120a may be positioned to have the bending portion 125 above the first support portion 131 and edges of the first and second connecting portions 123 and 124 inserted through corresponding openings 133 to be under corresponding edges the second supporting portion 132. The second support portion 132 is not necessarily formed to be contacted by the bus-bar 120a. In a case where the second support portion 132 and the bus-bar 120a are spaced apart from each other, the space provides a margin to relieve stress from a potentially deformed bus-bar 120a, as described previously with reference to the marginal space between the first support portion 131 and the bending portion 125. Thus, it is possible to reduce the stress applied to the bus-bar 120a.

Figure 6:
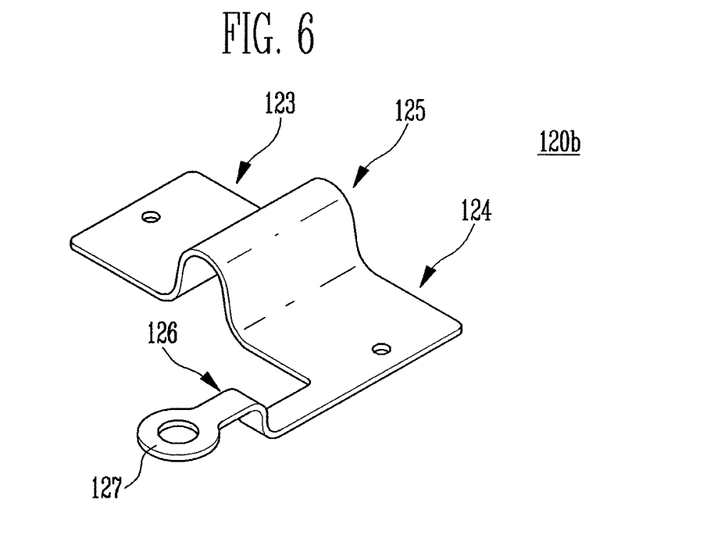
FIG. 6 illustrates a perspective view of a bus-bar of a battery module according to another embodiment.
Figure 7:
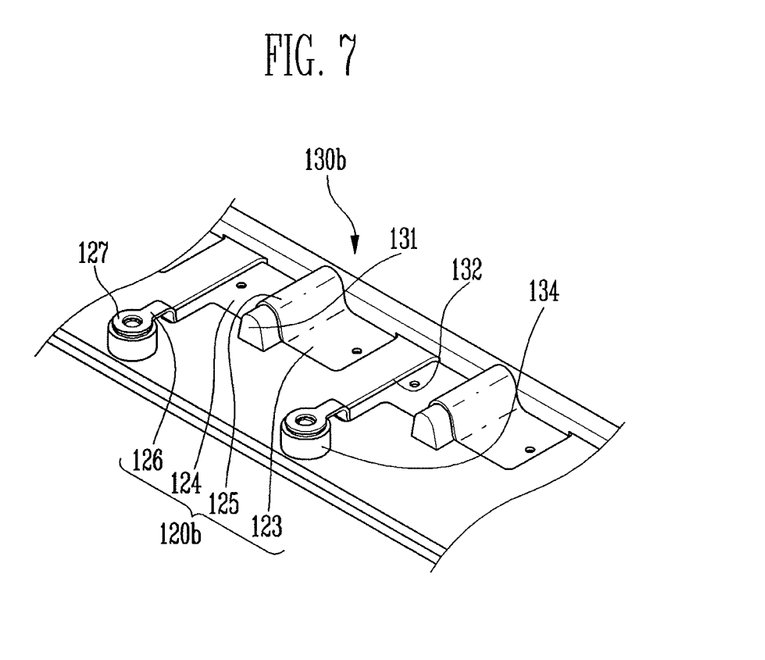
FIG. 7 illustrates a partial perspective view of a battery module with the bus-bar shown in FIG. 6.

FIG. 6 illustrates a perspective view of a bus-bar 120b of a battery module according to another embodiment. FIG. 7 illustrates a partial perspective view of the battery module to which the bus-bar 120b is applied. Hereinafter, the battery module according to this embodiment will be described with reference to FIGS. 6 and 7. Here, components identical or corresponding to those of the aforementioned embodiment are designated by like reference numerals, and their detailed descriptions will be omitted to avoid redundancy.

As shown in FIGS. 6 and 7, in addition to the first connecting portion 123, the second connecting portion 124, and the bending portion 125, the bus-bar 120b according to this embodiment may further include an extending portion 126 extended from at least one of the first and second connecting portions 123 and 124. In this case, the extending portion 126 is extended to a top surface of a bus-bar holder 130b. The extending portion 126 may be extended upward from a holder fastening portion 134 provided to the bus-bar holder 130b. In addition, a bus-bar fastening portion 127 may be provided at an end portion of the extending portion 126. The bus-bar fastening portion 127 may be positioned on the holder fastening portion 134. A terminal of a circuit board for controlling the battery module may be connected on the bus-bar fastening portion 127. Accordingly, the voltage, SOC, and the like of each battery cell 110 may be transmitted in real time to a controller of the circuit board.

Meanwhile, a hole having, e.g., a screw thread formed therein may be formed in the bus-bar fastening portion 127 and the holder fastening portion 134. In addition, a hole having a screw thread formed therein may also be formed in the terminal of the circuit board positioned on the bus-bar fastening portion 127. Thus, a bolt or the like is inserted into the holes, so that the circuit board, the bus-bar fastening portion 127, and the holder fastening portion 134 are coupled together. Accordingly, the bus-bar fastening portion 127 and the terminal of the circuit board can be electrically connected to each other.

According to embodiments, a battery module may include a bus bar having two opposite surfaces supported by a bus-bar holder, so that the bus-bar is conveniently aligned and coupled to a terminal portion of a battery cell, thereby facilitating processing, e.g., welding. Further, at least one portion of the bus-bar is bent to reduce stress applied to the bus-bar, thereby reducing stress applied to bus-bars, while having an easy connection for the bus-bar, thereby improving the safety of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a plurality of battery cells aligned in one direction, each battery cell of the plurality of battery cells including a terminal portion on a first surface of a respective battery cell;
   a bus-bar electrically connected between the terminal portions of the plurality of battery cells, the bus-bar including a first surface facing the first surfaces of the battery cells, and a second surface opposite to the first surface; and
   a bus-bar holder positioned on the first surfaces of the plurality of battery cells, the bus-bar holder including:
      a first support portion protruding from the battery cells toward the first surface of the bus-bar, and
      a second support portion having first and second sections integral with each other, the first section being in direct contact with a lateral surface of the bus-bar and having a same height as the bus-bar, and the second section extending from the first section and only partially overlapping the second surface of the bus-bar to directly contact the second surface of the bus-bar.

2. The battery module as claimed in claim 1, wherein the first support portion supports the first surface of the bus-bar; and
   the second support portion supports the second surface of the bus-bar.

3. The battery module as claimed in claim 1, wherein the second support portion of the bus-bar holder includes a pair of second support portions to respectively contact two opposite sides of the bus-bar, the first support portion being between the pair of second support portions.

4. The battery module as claimed in claim 1, wherein the bus-bar includes:
   a first connecting portion connected to the terminal portion of a first battery cell among the plurality of battery cells;
   a second connecting portion connected to the terminal portion of a second battery cell adjacent to the first battery cell in a first direction; and
   a bending portion connecting the first and second connecting portions, the bending portion protruding away from the first and second battery cells.

5. The battery module as claimed in claim 4, wherein the first support portion is positioned between the bending portion and the corresponding battery cells, the first support portion extending along an entire width of the bending portion in a second direction perpendicular to the first direction, and the second support portion being positioned on the second surface of the first and second connecting portions.

6. The battery module as claimed in claim 5, wherein the first support portion and the bending portion are spaced apart from each other.

7. The battery module as claimed in claim 5, wherein the first support portion is elastic.

8. The battery module as claimed in claim 5, wherein the first support portion protrudes away from the corresponding battery cells, the first support portion corresponding to a shape of the bending portion.

9. The battery module as claimed in claim 2, wherein the first support portion is configured to limit movement of the bus-bar toward the battery cell, and the second support portion is configured to limit movement of the bus-bar away from the battery cell.

10. The battery module as claimed in claim 4, wherein the bus-bar further comprises an extending portion, the extending portion extending from at least one of the first and second connecting portions to a top surface of the bus-bar holder.

11. The battery module as claimed in claim 10, wherein the extending portion has a bus-bar fastening portion at an end portion thereof, the bus-bar fastening portion extending on a holder fastening portion of the bus-bar holder.

12. The battery module as claimed in claim 1, wherein the bus-bar is connected to the terminal portion.

13. The battery module as claimed in claim 1, wherein the bus-bar holder further comprises an opening, at least one portion of the second surface of the bus-bar being exposed through the opening, and the first support portion extending across an entire width of the opening.

14. The battery module as claimed in claim 1, wherein the bus-bar includes at least one bending portion, the bending portion protruding away from the battery cells.

15. The battery module as claimed in claim 13, wherein an edge of the opening is at an edge of the second support portion on the second surface of the bus-bar.

16. The battery module as claimed in claim 4, wherein the first support portion protrudes from the battery cells into the bending portion of the bus-bar.

17. The battery module as claimed in claim 16, wherein the first support portion and the bending portion of the bus-bar have complementary shapes, the first support portion filling a majority of the bending portion.

18. The battery module as claimed in claim 1, wherein the first surface of the bus-bar is in direct contact with the terminal portion, and the second surface of the bus-bar is in direct contact with the second support portion.

19. The battery module as claimed in claim 18, wherein an edge of the bus-bar is directly between and in direct contact with the terminal portion and the second support portion, and the first support portion extends along an entire width of a central part of the bus-bar and between the bus-bar and the battery cells.

20. The battery module as claimed in claim 1, wherein second section of the second support portion is a flat sheet extending in parallel to the first surfaces of the battery cells.

* * * * *